United States Patent
Ohashi

(10) Patent No.: US 6,408,297 B1
(45) Date of Patent: Jun. 18, 2002

(54) INFORMATION COLLECTING APPARATUS

(75) Inventor: Tadashi Ohashi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/349,117

(22) Filed: Jul. 8, 1999

(30) Foreign Application Priority Data

Feb. 3, 1999 (JP) ............................................ 11-025948

(51) Int. Cl.$^7$ .............................................. G06F 17/30
(52) U.S. Cl. ...................... 707/10; 707/104.1; 709/217; 709/229; 713/201; 345/733
(58) Field of Search ........................... 707/1, 4, 8, 202, 707/3, 10, 104, 104.1; 713/200, 201; 345/733, 745, 744; 705/26, 27; 709/229, 217, 218

(56) References Cited

U.S. PATENT DOCUMENTS

| | | | | |
|---|---|---|---|---|
| 5,206,951 A | * | 4/1993 | Khoyi et al. ................... 707/10 |
| 5,371,675 A | * | 12/1994 | Greif et al. .................. 345/781 |
| 5,446,575 A | * | 8/1995 | Lysakowski, Jr. ......... 707/104.1 |
| 5,634,124 A | * | 5/1997 | Khoyi et al. ............. 707/103 R |
| 5,794,229 A | * | 8/1998 | French et al. ................... 705/35 |
| 5,812,130 A | * | 9/1998 | Van Huben et al. ........ 345/764 |
| 5,918,225 A | * | 6/1999 | White et al. .................... 707/1 |
| 5,959,621 A | * | 9/1999 | Newaz et al. ............... 345/329 |
| 5,983,268 A | * | 11/1999 | Freivald et al. ............. 709/218 |
| 6,012,087 A | * | 1/2000 | Freivald et al. ............. 709/218 |
| 6,014,622 A | * | 1/2000 | Moran et al. ................... 707/3 |
| 6,029,175 A | * | 2/2000 | Chow et al. ................. 707/104 |
| 6,088,693 A | * | 7/2000 | Van Huben et al. ............. 707/1 |
| 6,088,708 A | * | 7/2000 | Burch et al. ................. 707/509 |
| 6,182,111 B1 | * | 1/2001 | Inohara et al. ................ 707/10 |
| 6,212,554 B1 | * | 4/2001 | Roskowski .................. 709/217 |

FOREIGN PATENT DOCUMENTS

| | | | | |
|---|---|---|---|---|
| JP | 10-187753 | 7/1998 | ........... G06F/17/30 |
| JP | 10-260890 | 9/1998 | ........... G06F/12/00 |
| JP | 10-260978 | 9/1998 | ........... G06F/17/30 |

OTHER PUBLICATIONS

Voelker, Geoffrey et al., "Mobisaic: An Information System for a Mobile Wireless Computing Environment", Proceedings of the 1994 Workshop on Mobile Computing Systems and Applications, Dec. 8–9, 1994, pp. 185–190.*

* cited by examiner

*Primary Examiner*—Sanjiv Shah
*Assistant Examiner*—Shahid Alam
(74) *Attorney, Agent, or Firm*—Staas & Halsey LLP

(57) ABSTRACT

A client terminal in the information collecting apparatus collects a Web information described in hyper text language form a Web server terminal via the Internet. This client terminal starts up a browser and previously sets a flag at a target data cell in the collected Web information. The client terminal first automatically collects the latest Web information when the time in the timer reaches a prespecified time by utilizing a program for data transfer without starting up the browser, and then collects a latest data cell corresponding to the data cell for which a flag has been set.

12 Claims, 12 Drawing Sheets

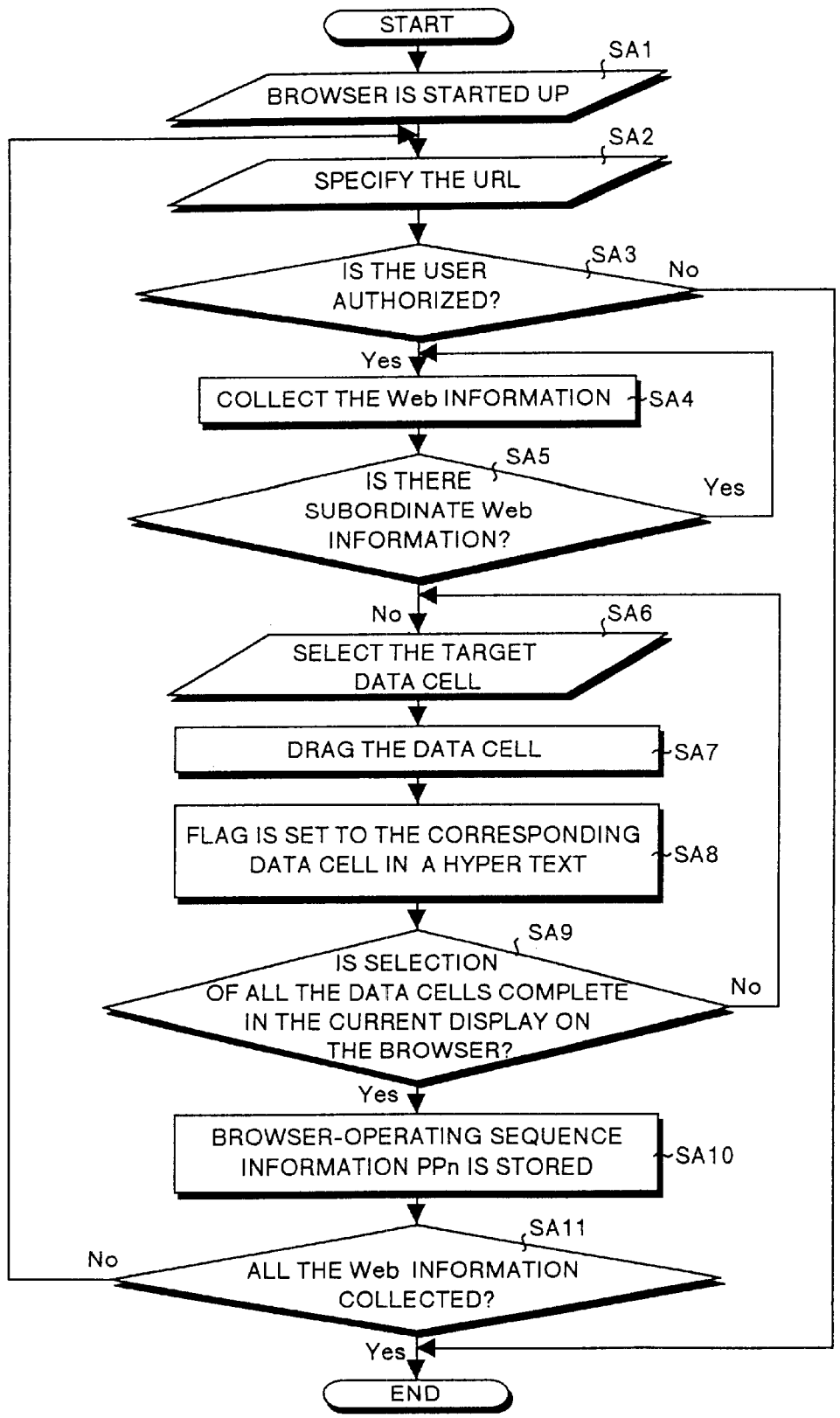

FIG.5A

| | | |
|---|---|---|
| URL | http://www.es.fujitsu.co.jp | $PP_0$ |
| SERVER-SIDE DIRECTORY | $dirS_3$ | |
| CLIENT-SIDE DIRECTORY | $dirC_2$ | |
| SEQUENCE NO. | OPERATION | |
| 1 | URL IS SET | |
| 2 | IS THE USER AUTHORIZED? | |
| 3 | COLLECT THE Web INFORMATION | |
| 4 | IS THERE SUBORDINATE Web INFORMATION ? | |
| 5 | SELECT THE TARGET DATA CELL | |
| 6 | DRAG THE DATA CELL | |
| 7 | FLAG IS SET TO THE CORRESPONDING DATA CELL IN A HYPER TEXT | |
| 8 | IS SELECTION OF ALL THE DATA CELLS COMPLETE IN THE CURRENT DISPLAY ON THE BROWSER ? | |

FIG.5B $Ht_0$

```
<TITLE>STOCK PRICE INFORMATION</TITLE>
<H1>A B C COMPANY  TODAY'S CLOSING PRICE : </H1>
<!-f-> <TD>¥3 8 5</TD>
```

FIG.5C $Web_0$

```
<TITLE>STOCK PRICE INFORMATION</TITLE>
<H1>A B C COMPANY  TODAY'S CLOSING PRICE : </H1>
<TD>¥4 2 0</TD>
```

FIG.11

| URL | LINE IMMEDIATELY BEFORE THE SCRAP DATA | INITIAL LINE OF THE SCRAP DATA | LINE IMMEDIATELY AFTER THE SCRAP DATA |
|---|---|---|---|
| http:www.aa.co.jp/index.html | <HR> | THIS WEEK'S RANKING | BACK NUMBER |
| http:www.bb.co.jp/index.html | <IMG SRC=picture.gif> | WEATHER IN TOKYO | WEATHER IN KANAGAWA |
| http:www.cc.co.jp/index.html | TODAY'S TOP NEWS | 10/21 15:00 UPDATE | <HR> |

FIG.12

SELECTION-START POINT

SELECTION-END POINT

```
<H2>A PAGE OF NEWSPAPER</H2>

TODAY'S TOP NEWS<BR>

<FONT size=2><I>10/21 15:00</I>UPDATE</FONT>

<UL>

<L1>NEWS FLASH ON ELECTION RESULT</L1>

<L1>YEN FURTHER GOES DOWN <L1>

<L1>RESULT OF THE JAPAN SERIES</L1>

</UL>

<HR>
    NEWS FLASH ON ELECTION RESULT<BR>
    THE TURNOUT OF VOTERS TO THE ELECTION OF
    THE HOUSEOF REPRESENTATIVES TOOK PLACE
    YESTERDAY WAS 59% WHICH IS THE LOWEST
    IN THE HISTORY
```

FIG.13

A PAGE OF NEWSPAPER

TODAY'S TOP NEWS

10/21 15:00 UPDATE
- NEWS FLASH ON ELECTION RESULT
- YEN FURTHER GOES DOWN
- RESULT OF THE JAPAN SERIES

NEWS FLASH ON ELECTION RESULT<BR>

THE TURNOUT OF VOTERS TO THE ELECTION OF THE HOUSE OF REPRESENTATIVES TOOK PLACE YESTERDAY WAS 59% WHICH IS THE LOWEST IN THE HISTORY

INFORMATION COLLECTING APPARATUS

FIELD OF THE INVENTION

The present invention relates to an information collecting apparatus for collecting information from WWW (World Wide Web) sites and more particularly to, an information collecting apparatus enabling quick and accurate collection of the information required by a user.

The amount of information contained in the WWW sites is increasing in association with recent rapid developments of the Internet. A browser is used for collecting and browsing this enormous information. When information is to be collected and browsed, a browser is started up in a client terminal and an URL (Uniform Resource Locator) which specifies the information containing site is supplied and the desired information is collected.

However, considering the background such as significant increase in the amount of information on the WWW sites in recent years and the high frequent of updating the information, it is getting difficult day by day to quickly collect the latest information because a browser is required to be repeatedly started up each time the desired information is to be collected.

BACKGROUND OF THE INVENTION

FIG. 9 is a block diagram showing a general configuration of an information collecting apparatus based on the conventional technology. The information collecting apparatus shown in this figure is connected to a network such as the Internet and collects information from the WWW sites. This information collecting apparatus comprises a display 101 for displaying data thereon, an input device 102 comprising a keyboard or a pointing device such as a mouse, a memory 103 for storing therein scrap data identifying information or the like described later, and a computer 104 providing controls over the display 101, the input device 102, and the memory 103 to execute various processing.

Herein, FIG. 10 shows a block diagram of functions of the information collecting apparatus based on the conventional technology. A shown in this figure, the information collecting apparatus comprises a user interface 201 for specifying a particular area of a WWW document by a user, a scrap data identifying information generating section 202 for generating scrap data identifying information used for identifying the data specified by a user inside a WWW document, a scrap information memory 203 for storing therein a set of a URL of the WWW document specified by the user and scrap data identifying information as scrap information, and a scrap page updating section 207.

The scrap page updating section 207 comprises a WWW document collecting section 205 for collecting a WWW document corresponding to the specified URL from a WWW server 208 via the Internet (not shown), a data extracting section 204 for cutting out a portion of a WWW document collected anew according to the scrap-data identifying information, and an extracted data linking section 206 for linking one extracted data to another to form one document.

In the description below, data that a user specifies on the user interface 201 is called "scrap data", information for identifying a starting point and an end point of the scrap data inside a WWW document is called "scrap data identifying information", and a set of a URL of a WWW document with scrap data specified by the user and the scrap data identifying information is called "scrap information". Herein, as the user interface 201 for specifying the scrap data, any kind of interface may be employed on condition that URL of a WWW document containing a data required by the user and a starting point as well as an end point in the WWW document can be identified. As an example of this user interface 201, a browser having a function of selecting a text on a display may be considered.

When the browser is used as the user interface 201, the user starts up the browser and selects a particular portion in the document as shown in FIG. 13 (the selected portion is shown in FIG. 13 as hatched area but in reality the portion may be displayed in reverse video). The selected portion represents the scrap data required by the user. FIG. 13 is a view showing an example (one of screen displays) of selection of scrap data on the browser.

When the scrap data is pointed using the user interface 201 as described above, the URL of the WWW document currently appearing on the browser is stored in the scrap information memory 203. Further, the browser (the user interface 201) transfers the displayed www document in a form of a HTML (Hyper Text Markup Language) document as well as the data specified by the user as scrap data to the scrap data identifying information generating section 202.

The scrap data identifying information generating section 202 generates the scrap data identifying information for identifying a starting point and an end point of the scrap data in the WWW document from the HTML document and the scrap data, and the scrap information memory 203 stores this information. This scrap data identifying information is used in the data extracting section 204 when information required by the user is collected afterward from a newly collected WWW document. Therefore, the scrap data identifying information satisfies, even after the WWW document at the WWW site (WWW server 208) is changed, a condition that the information is quite possible to remain the changed WWW document.

As an example of the scrap data identifying information satisfying the condition described above, contents of an initial line of scrap data and contents of immediately before or immediately after the starting or end points of the scrap data may be considered. Generally, the user specifies a portion inside a WWW document which have a possibility of being changed as scrap data, but, in many cases, the contents before and after such an area in the WWW document is not changed. Thus, contents of a line immediately before the scrap data, initial line of the scrap data, and a line immediately after the scrap data are important. Therefore, in the conventional type of information collecting apparatus, it is assumed that contents of a line immediately before scrap data, an initial line of the scrap data, and a line immediately after the scrap data are stored in the scrap information memory 203.

FIG. 11 is a view showing an example of scrap information stored in the scrap information memory 203. As show in this figure, information contained a line immediately before the scrap data, in the initial line of the scrap data, and in a line immediately after the scrap data is stored in the scrap information memory 203 in correlation with the URL of the WWW document-specified by the user. More specifically, when the scrap data (the section displayed in reverse video in FIG. 13) is specified by the user in a state in which the HTML document shown in FIG. 12 is displayed using the browser as shown in FIG. 13, the information shown in the third line in FIG. 11 is stored in the scrap information memory 203. Namely, the line immediately before the scrap data is "Today's top news" (Refer to FIG. 12), the initial line of the scrap data is "15:00 10/21 Update"

(Refer to FIG. 12), and the line immediately after the scrap data is <HR> (Refer to FIG. 12). It should be noted that <HR> is a tag representing a horizontal line.

When the information is stored in the scrap information memory 203 as described above and a request for collecting the latest WWW document is issued by the user, in other words, when the user starts up the browser, the WWW document collecting section 205 collects the latest WWW document corresponding to, for instance, the URL described in the third line of FIG. 11 from the WWW server 208 via the Internet (not shown). When the WWW document is collected, the data extracting section 204 identifies the starting point and the end point of data required by the user from the latest WWW document collected anew according to the scrap information stored in the scrap information memory 203, and extracts the data enclosed within the starting point and the end point. Then, the extracted data linking section 206 links the data extracted in the data extracting section 204 to other data and forms one HTML document. For details of the conventional type of information collecting apparatus, refer to Japanese Patent Laid-Open Publication No. HEI 10-187753.

A conventional type of information collecting apparatus is explained above in which, by specifying a starting point and an end point of the data required by the user in a WWW document, a latest WWW document is collected whenever a browser is started up and the specified data in the latest WWW document is extracted. Thus, in the conventional type of information collecting apparatus, it is possible to collect the data required by a user from a WWW document more easily as compared to a primitive method of collecting the data by starting up the browser and visually checking the data on the browser.

In the conventional type of information collecting apparatus, however, when data is to automatically be collected from a WWW document, it is necessary to start up the browser, which operation requires an operator. Further, it can not always be said that the information can quickly be collected if the time for starting up the browser is taken into account. Especially, when a WWW document is to be collected from a popular WWW site or when a WWW document having a high information value is to be collected, because of the high line-traffic due to centering of access on the corresponding WWW site there is a problem that the required information may not necessarily be collected when the browser is started up.

Therefore, in the condition described above, a desired WWW document can not be collected when and as required, in addition, access to such a WWW site has to be made many times at a specified interval, which requires the browser to be started up whenever the access is to be made, so that labor costs increase. There is a conceivable method of solving the problem by accessing a WWW site during late night hours when there is generally a less line traffic. However, this method requires the browser to be started up during late nigh hours, so that the method is not a practical one in consideration of a load to a user derived from late night work.

In addition, when real time information like stock price information is to be collected from a WWW site, in the conventional type of information collecting apparatus, latest stock price information has to momentarily be collected. The stock price, however, may fluctuate in many cases in association with external factors (e.g., fluctuations in the official rate). However, when the external factors do not change, useful information (for wild ups and downs of a stock price) cannot be obtained even if latest stock price information is momentarily collected, so that only useless information may be collected. Therefore, when the conventional type of information collecting apparatus is applied especially to collection of stock price or similar information, accurate information may not necessarily be collected.

SUMMARY OF THE INVENTION

It is an object of the present invention to provide an information collecting apparatus which can quickly and accurately collect information via a network.

In the present invention, as initialization, a flag setting unit collects, by starting up a browser, information from a server terminal via the Internet and sets a flag at a target data cell in the collected information. When this flag setting is completed, a information collecting unit collects the latest information without starting up the browser, and a data cell collecting unit collects a latest data cell corresponding to the data cell for which a flag has been set from the collected information. Thus, with the present invention, information (data cell) can quickly be collected without starting up a browser after a flag is set, namely, without requiring involvement by a user.

In the present invention, when the time in a timer reaches a prespecified value (e.g. time), the information collecting unit collects information from a server terminal without starting up a browser. Thus, with the present invention, time in a timer can be used as a trigger for collecting the latest information.

In the present invention, as initialization, a flag setting unit collects, by starting up a browser, information from a server terminal via the Internet and sets a flag at a target data cell in the collected information. When the flag setting is completed, a trigger information collecting unit starts collecting trigger information, and when the trigger information has satisfied a prespecified condition, a information collecting unit collects the latest information without starting up the browser. Furthermore, a data cell collecting unit collects a latest data cell corresponding to the data cell for which a flag has been set from the collected information. Thus, with the present invention, information (data cell) is collected by using trigger information closely related to fluctuations in information (data cell) to be collected as a trigger, thus a redundant operation of collecting information is not carried out.

In the present invention, in a flag setting unit, a browser-information collecting section collects the information, and then a display section displays screen information thereon. When the information is displayed, the data cell selecting section selects a target data cell, and the flag setting section sets a flag to a data cell in the information.

With the present invention, when a latest data cell is collected by the data cell collecting unit, a reporting unit reports the fact that the latest data cell has been collected to a user. Thus, the user can check the contents of the data cell as soon as he/she notices the report.

In the present invention, when a latest data cell is collected by the data cell collecting unit, in addition to a report to that effect, the reporting unit further reports the contents of the latest data cell to a user. Thus, the user can spontaneously check the fluctuating information obtained from the data cell.

Other objects and features of this invention will become understood from the following description with reference to the accompanying drawings.

BRIEF DESCRIPTION OF THE DRAWINGS

FIG. 2 is a flow chart for explaining the operation for initialization in the information collecting apparatus according to one embodiment of the present invention;

FIG. 5A shows an example of a browser-operating sequence information $PP_0$, FIG. 5B shows an example of a flag-set Web information $Ht_0$, and FIG. 5C shows an example of a latest Web information $Web_0$ in the information collecting apparatus according to the embodiment described above;

FIG. 11 is a view showing contents stored in the scrap information memory 203 shown in FIG. 10;

FIG. 12 is a view showing an example of a HTML document used in the conventional type of information collecting apparatus; and FIG. 13 is a view showing an example of selection of scrap data on a browser in the conventional type of information collecting apparatus.

DESCRIPTION OF THE PREFERRED EMBODIMENTS

Detailed description is made for a preferred embodiment of the information collecting apparatus according to the present invention with reference to the attached drawings.

Figure 1:
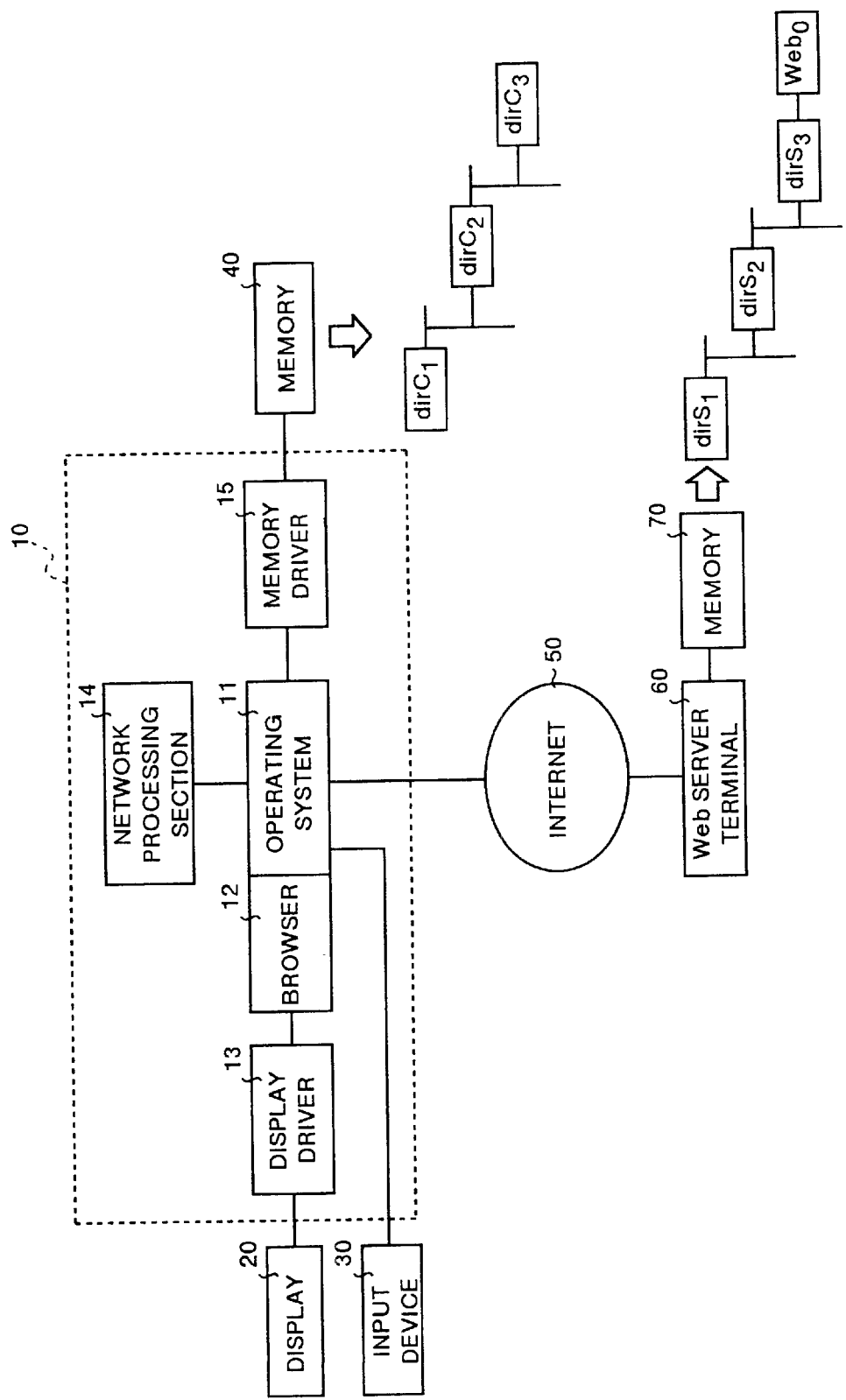
FIG. 1 is a block diagram showing configuration of an information collecting apparatus according to one embodiment of the present invention.

FIG. 1 is a block diagram showing configuration of an information collecting apparatus according to one embodiment of the present invention. As shown in this figure, this information collecting apparatus comprise a client terminal 10 which is a computer terminal provided in the side of a client. This client terminal 10 comprises an operating system 11, a browser 12, a display driver 13, a network processing section 14, and a memory driver 15. The client terminal 10 is connected to the Internet 50 and collects Web information from a Web server terminal 60 which will be described later.

In the client terminal 10, the operating system 11 is a program that performs information exchange between a computer and various types of peripheral equipment and also controls execution of an application program. The browser 12 is a program having functions of making a request to the Web server terminal 60 to transfer thereto Web information provided by the Web server terminal 60 via the Internet 50 and also receive the arrived Web information.

The Web information is the information in a hyper text form described with languages such as the above mentioned HTML, XML (extensible Markup Language), or SGML (Standardized Generalized Markup Language). Homepage information or stock price information are the examples of the Web information. The browser 12 has a function of displaying the received Web information in a form suitable for the Web information on the display 20. Each function of the operating system 11 and the browser 12 is realized by being executed by a CPU (Central Processing Unit) not shown herein.

The display driver 13 drives the display 20 under control of the operating system 11 (or the browser 12). The network processing section 14 executes processing such as protocol processing on computer-to-computer communications via the Internet 50 under control of the operating system 11. The memory driver 15 provides drive controls over writing data in and reading data from the memory 40 or the like under the control of the operating system 11.

The input device 30 comprises a mouse as a pointing device used for specifying coordinates on the screen of the display 20 and a keyboard used for entering various information. The memory 40 stores therein browser-operating sequence information $PP_0$ to $PP_n$, flag-set Web information $Ht_0$ to $Ht_n$, and the latest Web information $Web_0$ to $Web_n$ each described later. Furthermore, the memory 40 has a hierarchical structure of directories, in which a client-side directory $dirC_2$ is provided below the highest level directory $dirC_1$ in the client side, and further a client-side directory $dirC_3$ is provided below the client-side directory $dirC_2$.

On the other hand, the Web server terminal 60 is a computer terminal located in a side which provides the Web information and it is connected to the Internet 50. This Web server terminal 60 has a function of transmitting, when service (to transfer Web information) is requested from the client terminal 10 via the Internet 50, the Web information to the original client terminal 10. A memory 70 is connected to this Web server terminal 60 and stores therein various Web information.

This memory 70 has, similarly to the memory 40, a hierarchical structure of directories in which a server-side directory $dirS_2$ is provided below the highest level directory $dirS_1$ in the server side, and further a server-side directory $dirS_3$ is provided below the server-side directory $dirS_2$. In the memory 70, Web information is stored in each of the server-side directory $dirS_1$ to the server-side directory $dirS_3$ in the form of file(s). Each of the Web information is updated as required by the Web server terminal 60 when the contents is to be changed.

Operations of the information collecting apparatus according to the above mentioned embodiment are described here. Detailed description is made hereinafter for a case where the stock price information will be taken up as an example as Web information to be collected and desired data regarding the stock price information is collected using as a trigger some external cause (e.g., fluctuation in the official rate). The over all operations described below have been divided into operation for initialization and operation for collecting the information automatically.

(Operation for Initialization)

Figure 3A:
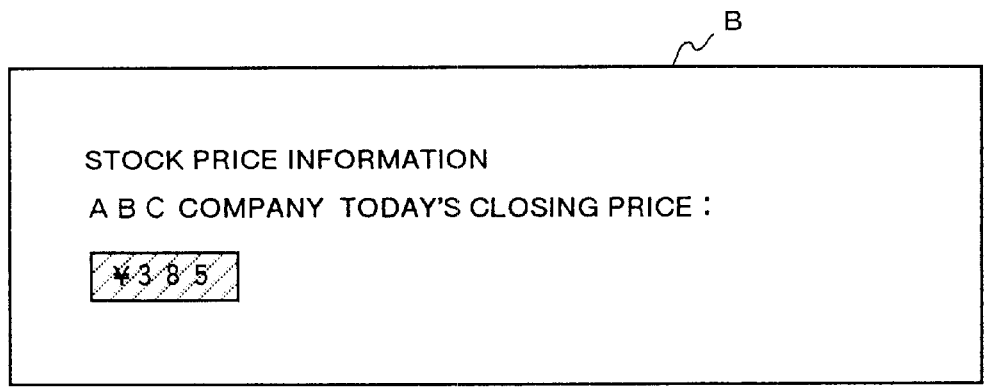
FIG. 3A is an example of a browser screen B and FIG. 3B is an example of a Web information $Web_0$ for initialization in the information collecting apparatus according to the embodiment described above.
Figure 3B:
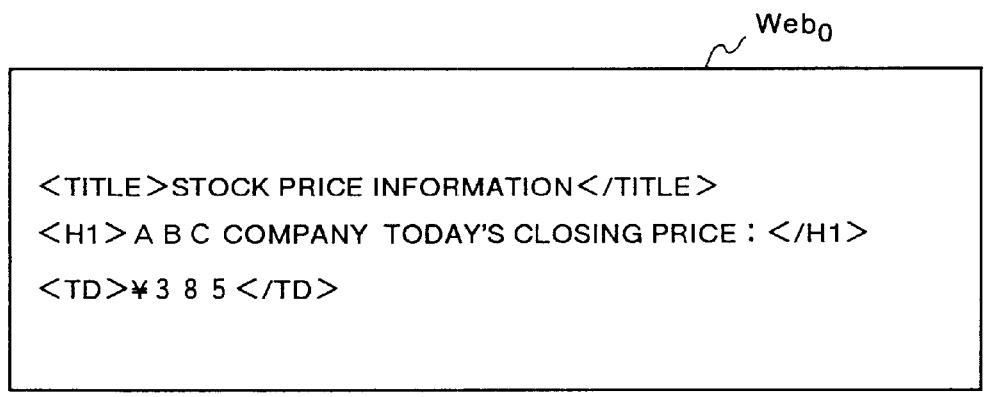

At first, detailed description is made for the operation for initialization with reference to the flow chart shown in FIG. 2. It is assumed here that the Web information $Web_0$ regarding the stock price information shown in FIG. 3B is stored in the server-side directory $dirS_3$ of the memory 70 in the form of a file. The user start up the browser 12 as shown in step SA1 of FIG. 2, inputs data through the input device 30 to start up the browser 12. With this, the system control is shifted to step SA2.

In step SA2, the user sets a URL (e.g., http//www.es.fujitsu.co.jp) of a site that stores the Web information $Web_0$ as the stock price information, further the user enters the user ID and the password. With this operation, the user can get access to the Web server terminal 60 by means of the browser 12 via the Internet 50. When the Web server terminal 60 is accessed, the Web server terminal 60 shifts the system control to step SA3.

In step SA3, the Web server terminal 60 verifies the user ID and the password and determines whether the user is an authorized user or not. When a result of this determination is negative, i.e. when the user as an unauthorized user, then the Web server terminal 60 prohibits the access to the information and stops the processing. When the result of determination in step SA3 is positive, then a connection between the client terminal 10 and the Web server terminal 60 is established via the Internet 50. Then the browser 12 performs the processing in step SA4 by which the browser 12 collects the desired Web information $Web_0$ (Refer to FIG. 3B) through the Internet 50 from the server-side directory $dirS_3$ of the memory 70 identified by the URL via the Web server terminal 60.

Herein, Web information $Web_0$ shown in FIG. 3B is the information in the hyper text form, which contains information like a closing price (¥385 in the example of FIG. 3B) of the stock price in ABC Company as stock price information. In this Web information $Web_0$ each character string ("stock price information", "ABC Company today's closing price:", and "¥385") is placed within tags.

Namely, the "stock price information" is placed within the tags <TITLE> and </TITLE> representing a title, "ABC Company today's closing price:" is placed within the tags <H1> and </H1> representing a heading, and "¥385" is placed within the tags <TD> and </TD> representing data. In the above mentioned Web information $Web_0$, "stock price information", "ABC Company today's closing price:", and "¥385" will be called as data cells respectively. Each of the data cells is a data consisting of a minimum character string placed within tags. In the Web information $Web_0$, the data cell which is updated from time to time is "¥385".

When the Web information $Web_0$ (Refer to FIG. 3B) is collected, the browser 12 converts the Web information $Web_0$ into a specified form, displays the information on the display 20 via the display driver 13, and then the system control is shifted to step SA5. FIG. 3A is a view showing a browser screen B of the display 20 in this case. As shown in this figure, "stock price information", "ABC Company today's closing price:", and "¥385" corresponding to the Web information $Web_0$ (Refer to FIG. 3B) is displayed in three separate lines on the browser screen B. Therefore, the user recognizes that today's closing price of a share of the ABC Company is ¥385.

In step SA5, the user determines, from the data displayed on the browser screen B of the display 20 whether there is any subordinate Web information to the above mentioned Web information $Web_0$ or not. When the user determines that there is a subordinate Web information he/she inputs a command indicating that there is a subordinate Web information using the mouse or the keyboard. When such a command is received from the user, the system control is returned to the above mentioned step SA4 and the subordinate Web information is collected by specifying the subordinate Web information using the input device 30. Herein it is assumed that there is no subordinate Web information so that system control is shifted to the next step i.e. step SA6.

In step SA6, the user visually checks the browser screen B (Refer to FIG. 3A) displayed on the display 20 and selects a target data cell. When the selection of the target cell data is completed, the system control is shifted to step SA7. The target data cell is a data cell of which the information is required by the user and it is also a data cell which is updated very frequently. In the example shown in FIG. 3B, of the three data cells of "stock price information", "ABC Company today's closing price:", and "¥385", the target data cell is "¥385" because it is updated very frequently. Herein it will be assumed that the user has selected "¥385" as the target data cell.

In step SA7, the user drags the selected data cell ("¥385" in FIG. 3A) with the mouse of the input device 30 and presses any key of the input device 30. As a result, the data cell "¥385" shown in FIG. 3A is displayed in reverse video under control of the operating system 11 and the browser 12. When the data cell is displayed in reverse video then the coordinates of the data cell "¥385" on the browser screen B can be recognized by the operating system 11.

In the next step i.e. the step SA8, the operating system 11 recognizes the attribute of the data cell from the tag in the Web information $Web_0$ (hyper text) corresponding to the data cell "¥385" represented by the coordinates dragged in step SA8, and sets a flag at this data cell (tag <TD>). More specifically, as shown in FIG. 5B, a flag <!-F-> is set before the tag <TD> of the data cell <TD> ¥385 </TD>. The Web information $Web_0$ with the flag <!-F-> set therein is stored in a directory such as the client-side directory $dirC_2$ in the memory 40 as flag-set Web information $Ht_0$ shown in FIG. 5B.

In the next step i.e. the step SA9, the user determines whether selection of all the target data cells on the current browser screen shown in FIG. 3A has been finished or not. When the user determines that there are any other data cell to be selected, the user inputs a command indicating that there is a data cell to be selected using the mouse or the keyboard of the input device 30. When such a command is received from the user, the system control is returned to the above mentioned step SA6 and the sequence of operations described above is repeated. Herein it is assumed that the user determines in step SA9 that there is no other data cell to be selected so that the user inputs a command indicating that there is no data cell to be selected using the mouse or the keyboard of the input device 30.

In the next step i.e. the step SA10, the operating system 11 generates the browser-operating sequence information $PP_0$ shown in FIG. 5A, and stores the information in a directory such as the client-side directory $dirC_2$ in the memory 40. This browser-operating sequence information $PP_0$ is the information showing a sequence (step SA2 to step SA9 in FIG. 2) in the client terminal 10 for collecting the above mentioned Web information $Web_0$ (Refer to FIG. 3B). Namely, in FIG. 5A, sequence numbers 1 to 8 correspond to steps SA2 to SA9, and each operation corresponds to each process in the steps SA2 to SA9.

Furthermore, as the browser-operating sequence information $PP_0$ there are a URL of Web information $Web_0$, a server-side directory $dirS_n$ (in this case, a server-side directory $dirS_3$) as a storage site of the Web information $Web_0$ in the Web server terminal 60, and a client-side directory $dirC_n$ (in this case, a client-side directory $dirC_2$) as a storage site of the Web information $Web_0$ collected in the client terminal 10.

In the next step i.e. the step SA11, the user determines whether all the Web information has been collected or not. When the user determines that there is still some information which has not been collected, then the user inputs a command indicating that there is still some information which has not been collected using the mouse or the keyboard of the input device 30. When such a command is received from the user, the system control is returned to the above mentioned step SA2 and the sequence of operations described above is repeated. Thus, by repeating the operations from step SA2 to step SA10, the browser-operating sequence information $PP_0$ to $PP_n$ and flag-set Web information $Ht_1$ to $Ht_n$ is successively stored in the memory 40. Herein it is assumed that the user determines in step SA11 that all the required information has been collected so that the user inputs a command indicating that all the required information has been collected using the mouse or the keyboard of the input device 30. When such a command is received from the user, the collection of Web information using the browser 12 is terminated and the browser 12 is set in a mode for executing an operation of automatically collecting the information described below.

(Operation of Automatically Collecting the Information)

Figure 6:
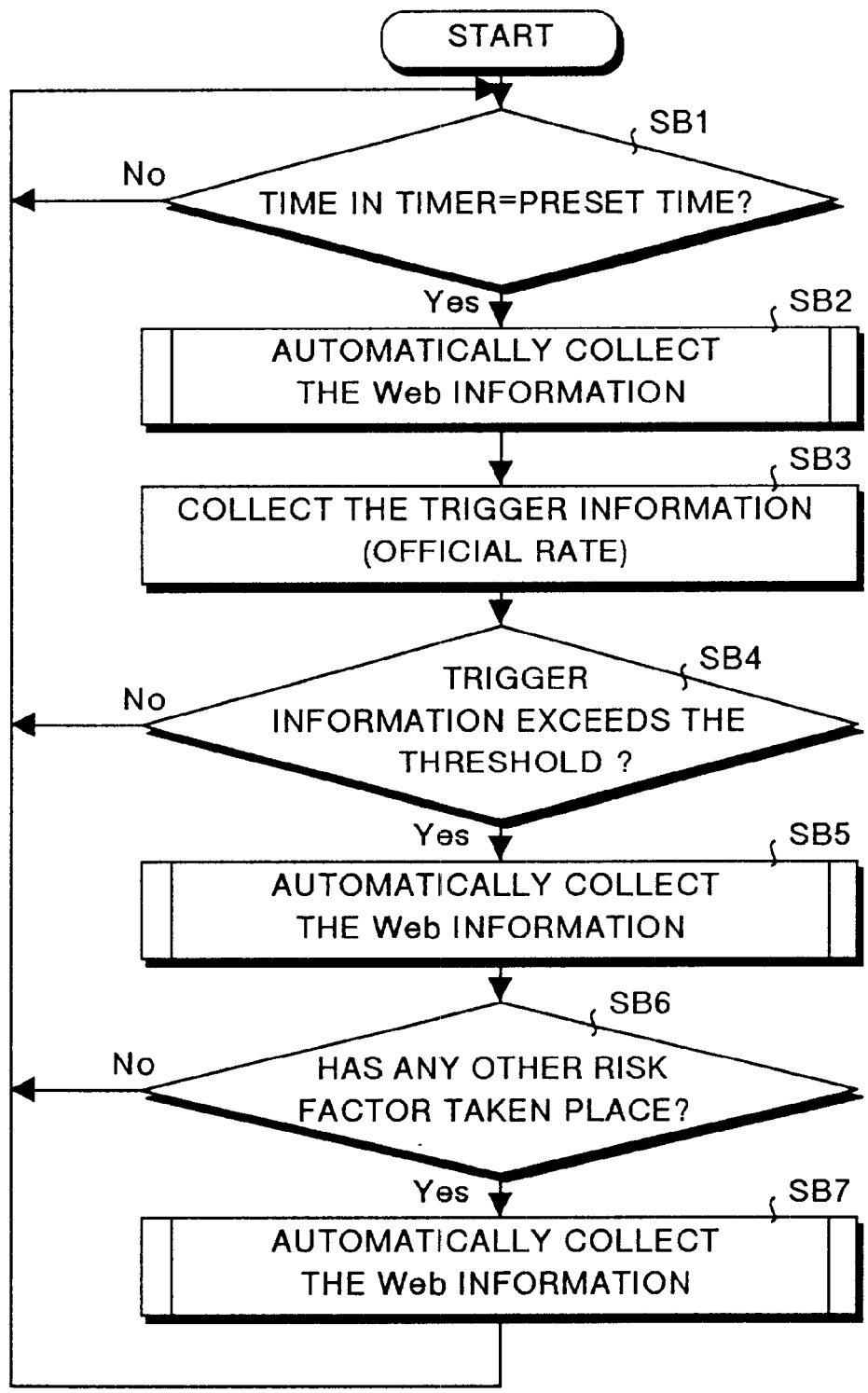
FIG. 6 is a flow chart for explaining the operation of automatically collecting the information in the information collecting apparatus according to the embodiment described above.

Detailed description is made for an operation of automatically collecting the information performed in the client terminal 10 based on the above mentioned operation for initialization with reference to a flow chart shown in FIG. 6.

This operation of automatically collecting the information is an operation for automatically collecting a target data cell, which is set in the operation for initialization without starting up the browser 12, in other words, without any operation by a user. Although the operation of automatically collecting the information described below is an operation performed by means of the application program prepared according to flow charts shown in FIG. 6 and FIG. 7 executed by the CPU (not shown) of the client terminal 10, description will assume for convenience in description that the operation will be performed by the client terminal 10.

When the mode is the mode of operation for automatically collecting the information, the client terminal 10 performs the processing in step SB1 shown in FIG. 6. In step SB1, the client terminal 10 determines whether a time of a timer not shown herein has reached a preset time or not. The client terminal 10 repeats this determination until the time in the timer reaches the preset time. When the time in the timer reaches the preset time, then the system control is shifted to step SB2.

In step SB2, the client terminal 10 executes the processing of automatically collecting the Web information. Detailed description is made for this processing of automatically collecting the Web information with reference to a flow chart shown in FIG. 7. In step SC1 shown in FIG. 7, the client terminal 10 initializes a pointer of the browser-operating sequence information $PP_n$. In this case, the client terminal 10 sets a pointer "0" showing a storage address of browser-operating sequence information $PP_0$ stored in the client-side directory $dirC_2$ in the memory 40 as an initial value for the pointer.

In step SC2, the client terminal 10 reads out and selects the browser-operating sequence information $PP_0$ (Refer to FIG. 5A) from the memory 40 according to the pointer "0" set in step SC2. In step SC3, the client terminal 10 obtains the URL (http://www.es.fujitsu.co.jp) of the Web information $Web_0$ to be collected from the browser-operating sequence information $PP_0$ shown in FIG. 5A. In step SC4, the client terminal 10 obtains the server-side directory $dirS_3$ and client-side directory $dirC_2$ from the browser-operating sequence information $PP_0$ shown in FIG. 5A in the same manner as described above.

In step SC5, the client terminal 10, at first, substitutes the URL (http://www.es.fujitsu.co.jp), the server-side directory $dirS_3$, the and client-side directory $dirC_2$ obtained in step SC3 and step SC4 respectively into the argument BURLY, the argument "$disS_n$", and the argument "$disC_n$" of a data transfer function (webget (URL, $disS_n$, $disC_n$)) respectively. Herein, the data transfer function is a function used for transferring the Web information identified by the argument "URL" from the server-side directory $dirS_n$ to the client-side directory $dirC_n$, and is a kind of FTP (File Transfer Protocol).

Thus, the data transfer function (webget (http://www.es.fujitsu.co.jp, $disS_n$, $disC_n$)) in this case is a function used for transferring the Web information $Web_0$ stored in the server-side directory $dirS_3$ shown in FIG. 1 to the client-side directory $dirC_2$ of the memory 40 via the Web server terminal 60, the Internet 50, and the client terminal 10. The client terminal 10 collects the latest Web information $Web_0$ from the server-side directory $dirS_3$ by executing the data transfer function, stores the collected data in the client-side directory $dirC_2$, and shifts the system control to step SC6.

Figure 4:
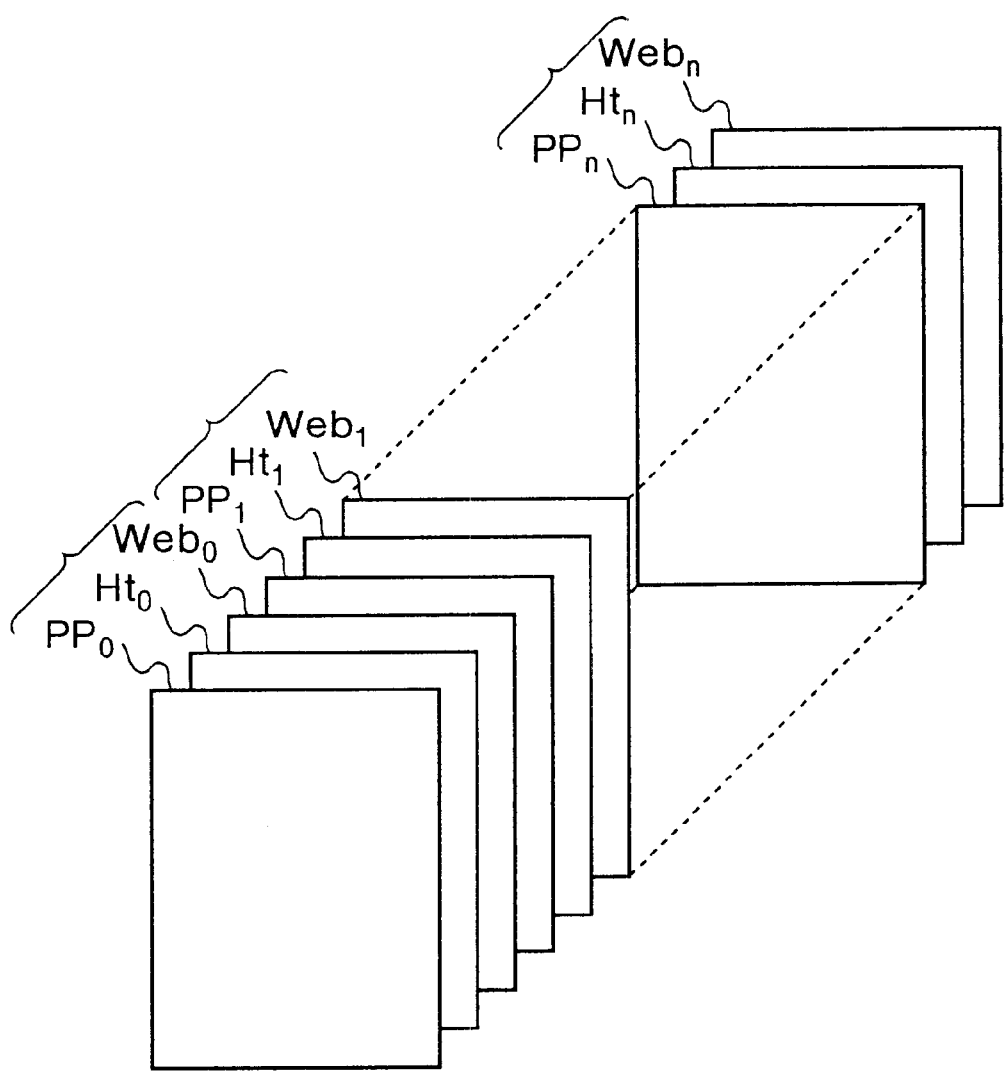
FIG. 4 shows an example of contents stored in the storage device 103 shown in FIG. 1.

The latest Web information $Web_0$ contains the latest stock price ("¥420") as shown in FIG. 5C. As shown in FIG. 4, the browser-operating sequence information $PP_0$ (Refer to FIG. 5A), the flag-set Web information $Ht_0$ (Refer to FIG. 5B), and the latest Web information $Web_0$ (Refer to FIG. 5C) are stored in the client-side directory $dirC_2$ of the memory 40 as one set of information.

In step SC6, the client terminal 10 searches a data cell having a flag set thereto in the flag-set Web information $Ht_n$ (in this case, flag-set Web information $Ht_0$ (Refer to FIG. 5B)). In the example explained here, the client terminal 10 finds the data cell "¥385" to which a flag <!-F-> (a section enclosed by a dotted line) is set in the flag-set Web information $Ht_0$ shown in FIG. 5B.

In step SC7, the client terminal 10 obtains a data cell corresponding to the flag-set data cell found in step SC6 in the latest Web information $Web_n$ (in this case, the latest Web information $Web_0$ (Refer to FIG. 5C)). In this case, the client terminal 10 collects "¥420" shown in FIG. 5C as the latest data corresponding to the flag-set data cell "¥385" in the flag-set Web information $Ht_0$ shown in FIG. 5B.

In step SC8, the client terminal 10 determines whether all the latest data cells have been collected in the Web information $Web_0$ or not. When there are any data cells for which the information is to be collected, the client terminal 10 returns the system control to step SC6 and repeats the sequence of operations described above. In the example explained here there is only one latest data cell, so that the client terminal 10 determines in step SC8 that there is no more latest data cell to be collected.

In step SC9, the client terminal 10 determines whether the processing in step SC2 to step SC8 for the pointer set in step SC1 has been finished or not. When there is any remaining pointer, the client terminal 10 returns the system control to step SC6, and performs processing for the next pointer "1". In the processing for the pointer "1", the latest data cell is collected by using the browser-operating sequence information $PP_1$, flag-set Web information $Ht_1$, and the latest Web information $Web_1$. In the example explained here, because the pointer set in step SC1 is only one i.e. "0", the client terminal 10 determines in step SC9 that no pointer is remaining. When no pointer is remaining, the system control is returned to step SB3 shown in FIG. 6.

In step SB3, the client terminal 10 collects information concerning trigger information (e.g., the official rate (Refer to FIG. 8)) using an email or the like. The trigger information indicates information used for determining whether collection of the latest data cell is to be started or not through the above mentioned processing for automatically collecting the Web information, further, it is the information used for determining a high or low possibility of the data cell being updated. In this case, the official rate (trigger information) is one of information closely related to fluctuations in stock price information (data cell) to be collected.

Figure 8:
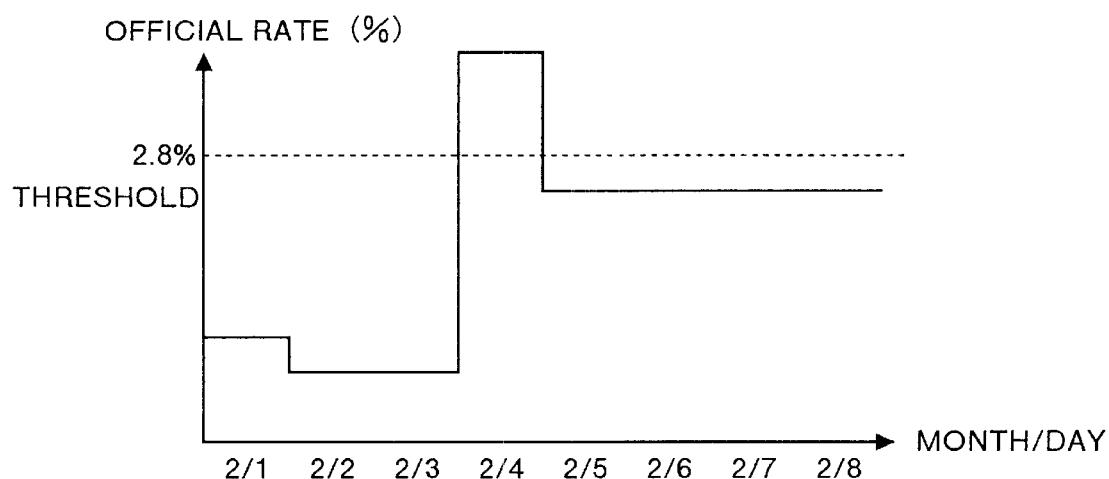
FIG. 8 explains the fluctuations in the official rate used in the information collecting apparatus according to the embodiment described above.
Figure 9:
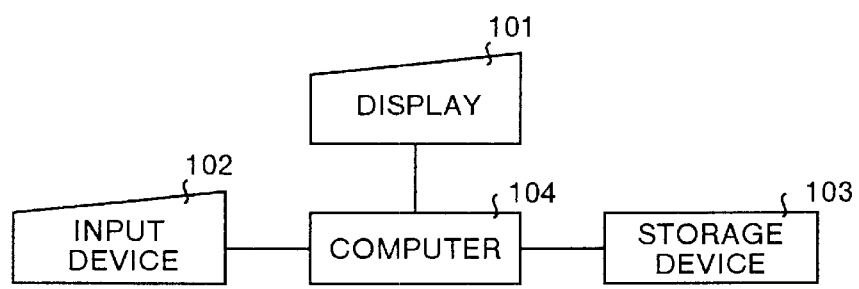
FIG. 9 is a block diagram showing a general configuration of an information collecting apparatus based on the conventional technology.
Figure 10:
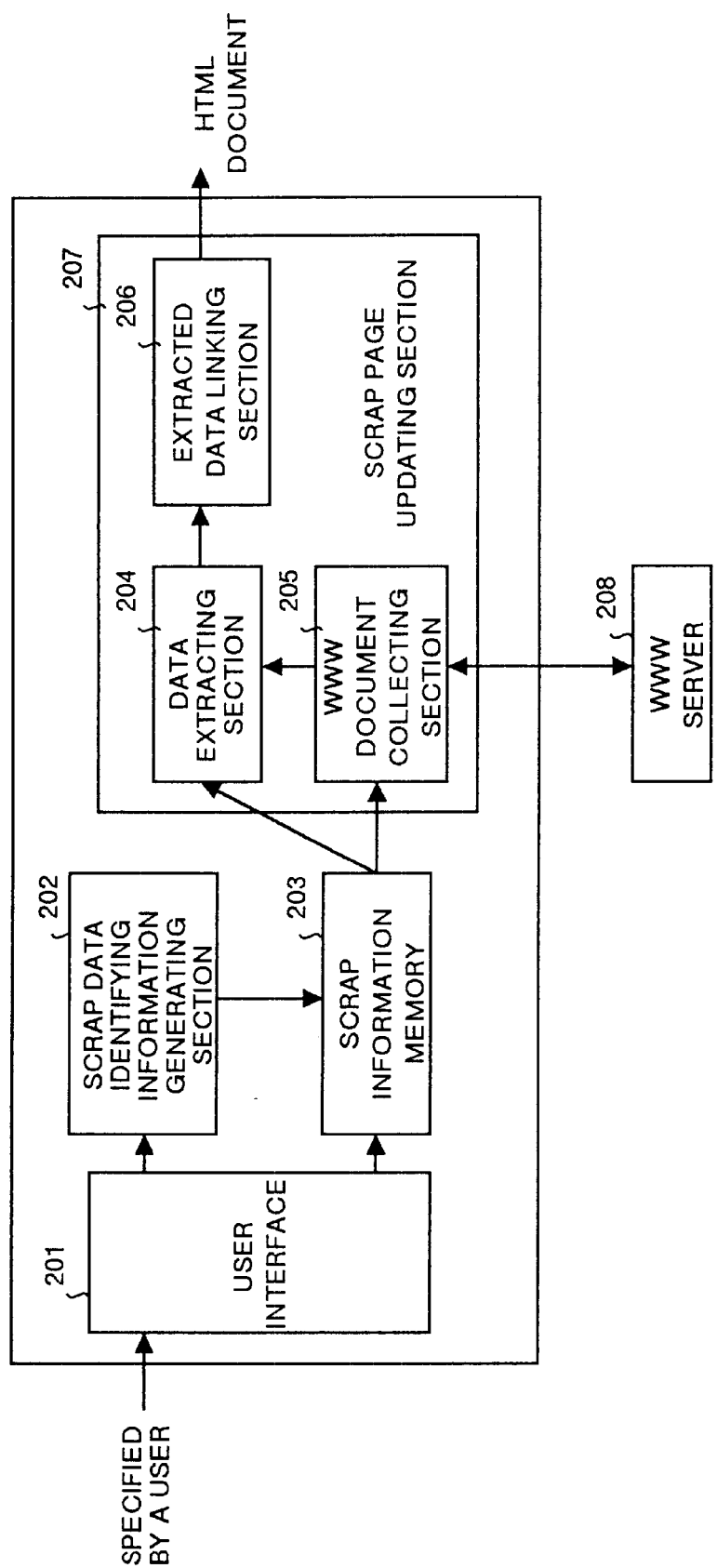
FIG. 10 is a block diagram showing functions of the information collecting apparatus based on the conventional technology.

In step SB4, the client terminal 10 determines whether the trigger information (official rate) collected in step SB3 exceeds a threshold (e.g. 2.8%) shown in FIG. 8 or not. Namely, since the official rate on the dates from February 1 to 3 shown in FIG. 8 does not exceed the threshold, during these dates the client terminal 10 determines that the official rate does not exceed the threshold so that the system control is returned to the step SB1.

On the other hand, when the official rate exceeds the threshold value like on the date February 4 as shown in FIG. 8, the client terminal 10 determines that the official rate has exceeded the threshold so that the system control is shifted to step SB5. In step SB5, the client terminal 10 executes the processing for automatically collecting the Web information in the same manner as that in step SB3. Thus, on this date, information for a stock price (data cell) under the situation where the official rate is higher than the threshold, which affects the stock price, can accurately collected.

In step SB6, the client terminal 10 determines whether any factor other than a risk factor against a stock price that the trigger information (official rate) is higher than the threshold value has taken place or not from information obtained through email or the like. When such a risk factor has not occurred, the client terminal 10 returns the system control to the step SB1. On the other hand, when it is determined that any other risk factor has occurred, the client terminal 10 shifts the system control to step SB7. In step SB7, the client terminal 10 collects, similarly to step SB2, information for the latest stock price (data cell) by executing the processing of automatically collecting the Web information by utilizing occurrence of some other risk factor as a trigger and then the system control is returned to the step SB1.

Figure 7:
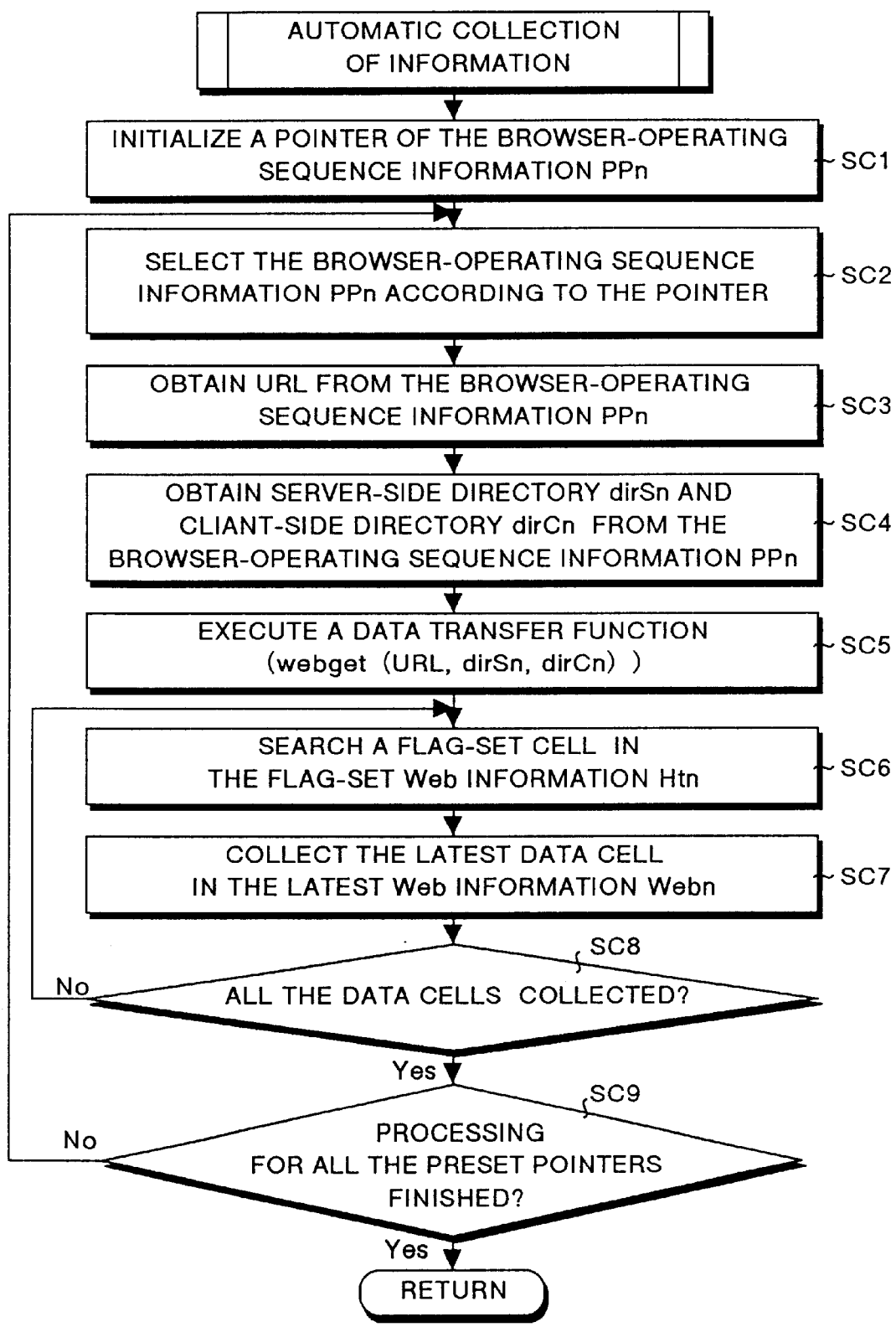
FIG. 7 is a flow chart for explaining processing of Web-information automatic collection in the information collecting apparatus according to the embodiment described above.

As described above, in the information collecting apparatus according to the above mentioned one embodiment, a target data cell is set in the operation for initialization (Refer to FIG. 2), and the latest data cell is collected in place of starting up the browser by executing the application program represented by the flow charts shown in FIG. 6 and FIG. 7 without requiring involvement by an operator. Thus, with the information collecting apparatus of the present invention, information (latest data cell) can quickly be collected via the Internet 50.

With the information collecting apparatus according to the above mentioned embodiment, a data cell is collected by utilizing a trigger information (official rate) that is closely related to fluctuations in the data cell (stock price) to be collected as a trigger, which allows information (latest data cell) to accurately be collected without occurrence of an operation for collecting useless data.

Although the information collecting apparatus has been described with respect to one embodiment of the present invention, examples of specific configuration are not to be thus limited but are to be construed as embodying all modifications and alternative constructions that may occur to one skilled in the art which fairly fall within the basic teaching herein set forth. For example, in the information collecting apparatus according to one embodiment of the present invention, any operating system may be used as the operating system 11 (Refer to FIG. 1).

Furthermore, in the information collecting apparatus according to one embodiment of the present invention, the application program based on the flow charts shown in FIG. 6 and FIG. 7 may be described with language such as C language or Java language, which means that the programming language has no effect on the present invention. Furthermore, in the information collecting apparatus according to one embodiment described above, only a time of the timer may be used as a trigger for collecting information like in step SB1 shown in FIG. 6, and also only trigger information may be used as a trigger for collecting information like in step SB4 in the same manner as described above.

Furthermore, in the information collecting apparatus according to one embodiment described above, although stockprice information as Web information and the official rate as trigger information have been described as one example, those information is not limited to the information described above, therefore, any kind of Web information may be employed and any kind of trigger information may be used on condition that the information is closely related to fluctuations in the Web information. In the information collecting apparatus according to one embodiment described above, although the case where the Internet 50 is used as a transfer medium has been described, any type of network may be used, and the present invention is also applicable in an intracompany network or the like with client terminals each for collecting information from a server terminal connected thereto.

In addition, in the information collecting apparatus according to one embodiment described above, at a point of time when a target data cell is collected in step SB2 shown in FIG. 6, or at the point of time when a target data cell is collected in step SB5, the fact that the data has been collected and contents of the data cell may be displayed on the display 20 or may be reported to the user with a beeper or through a speaker. In this case, as the user can recognize a latest data cell concurrently when the latest data cell is collected, quick response to fluctuations in the data cell or the like can be made.

As described above, with the present invention, when setting of a flag is complete, the information collecting unit collects the latest information without starting up the browser, and the data cell collecting unit collects a latest data cell corresponding to the data cell for which a flag has been set from the collected information, which allows information (data cell) to quickly be collected without requiring involvement of a user.

With the present invention, when the time in a timer reaches a prespecified value (e.g. time), the information collecting unit collects the information from a server terminal without starting up a browser, which allows information (data cell) to be collected during late night hours when there is a less traffic on the network. Therefore, with the present invention, information (data cell) can efficiently and quickly be collected.

With the present invention, information (data cell) is collected by using trigger information which is closely related to fluctuations in the information (data cell) to be collected as a trigger, so that a useless operation of collecting information is not carried, thus accurate information (data cell) being collected.

With the present invention, in the flag setting unit, the browser-information collecting section collects the information, and then a data cell is selected according to screen information displayed on the display section, which allows a user to easily select a target data cell while checking the screen information, thus an operational load in initialization to a user being reduced.

With the present invention, when a latest data cell is collected by the data cell collecting unit, the reporting unit reports the fact that the latest data cell has been collected to a user, which allows the user to check contents of the data cell as soon as the report is received, thus extremely quick response to data cell fluctuations being given.

With the present invention, when a latest data cell is collected by the data cell collecting unit, in addition to reporting to the user that the latest data has been, the reporting unit further reports contents of the latest data cell to a user, which allows the user to check fluctuating information obtained from the data cell at once, thus extremely quick response to data cell fluctuations being given.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information collecting apparatus for collecting information provided by a server via a network; said apparatus comprising:
    a display unit for collecting the information by starting up a browser and displaying the collected information;
    a flag setting unit setting a flag at a target data cell that has been selected with a drag operation or has been interactively selected from the displayed information;
    an information collecting unit for collecting a latest information via the network from said server without starting up the browser after setting the flag by said flag setting unit; and
    a data cell collecting unit for collecting a latest data cell corresponding to the data cell for which a flag has been set according to the information collected by said information collecting unit.

2. An information collecting apparatus according to claim 1 further comprises a timer for counting the time; wherein
    when the time in said timer reaches a prespecified value, said information collecting unit collects the latest information from said server terminal via said network without starting up the browser.

3. An information collecting apparatus according to claim 1; wherein said flag setting unit comprises:
    a browser information collecting section for collecting said information by starting up the browser;
    a display section for displaying screen information according to the collected information;
    a data cell selecting section for selecting a target data cell on the screen information; and
    a flag setting unit for setting a flag to a data cell in the collected information corresponding to the data cell selected by said data cell selecting section.

4. An information collecting apparatus according to claim 1 further comprising a reporting unit for reporting, when the latest data cell is collected by said data cell collecting unit, to a user the fact that the latest data cell has been collected.

5. An information collecting apparatus according to claim 4; wherein said reporting unit further reports contents of the latest data cell to a user.

6. An information collecting apparatus for collecting information provided by a server via a network; said apparatus comprising:
    a display unit for collecting the information by starting up-a browser and displaying the collected information;
    a flag setting unit setting a flag at a target data cell that has been selected with a drag operation or interactively selected from the displayed information;
    a trigger-information collecting unit for collecting a bigger information closely related to fluctuations in the target data cell;
    a determining unit for determining whether Me trigger information satisfies a prespecified condition or not;
    an information collecting unit for collecting, when it is determined by said determining unit that the trigger information has satisfied the prespecified condition, the latest information from said server via said network without starting up the browser; and
    a data cell collecting unit for collecting a latest data cell corresponding to the data cell for which a flag has been set according to the information collected by said information collecting unit.

7. An information collecting apparatus according to claim 6; wherein said flag setting unit comprises:
    a browser information collecting section for collecting said information by starting up the browser;
    a display section for displaying screen information according to the collected information;
    a data cell selecting section for selecting a target data cell on the screen information; and
    a flag setting unit for setting a flag to a data cell in the collected information corresponding to the data cell selected by said data cell selecting section.

8. An information collecting apparatus according to claim 6 further comprising a reporting unit for reporting, when the latest data cell is collected by said data cell collecting unit, to a user the fact that the latest data cell has been collected.

9. An information collecting apparatus according to claim 8; wherein said reporting unit further reports contents of the latest data cell to a user.

10. An inflation collecting apparatus for collecting information provided by a web server via a network, said apparatus running on a client computer and comprising:
    a display unit for displaying in a browser information to be collected;
    a flag setting unit for setting at the client a flag stored at the client that identifies a target data cell in the displayed information to be collected, by dragging or interactively selecting the displayed target data cell;
    an information collecting unit for collecting in the background a latest version of the information to be collected, via the network from said server after setting the flag by said flag setting unit; and
    a data cell collecting unit pulling from the server, in response to a trigger event originating at the client, a latest data cell corresponding to the data cell for which a flag has been set according to the information collected by said information collecting unit.

11. A method of automatically obtaining at a client computer information at a web server, comprising:
    storing information describing a sequence of browser inter-actions that lead to the browser displaying a web page made available by the web server, wherein the web page is a last of a plurality of web pages displayed according to the sequence of browser interactions;

storing, at the client computer, a flag identifying a target field and set by dragging or interactively selecting the target field in the web page displayed by the browser, where field identifying information identifies the selected field; accessing, from the server to the client, a later available version of the web page, by automatically accessing the web server according to the information describing the sequence of browser interactions, wherein said accessing is initiated at the client; and locating, responsive to said accessing, a later content of the field, by referring to the field identifying information and the later version of the web page.

12. The method according to claim 11, wherein the selecting comprises dragging over an area of the displayed web page that contains the field.

* * * * *